April 21, 1953        F. S. FIELD        2,635,372
VEHICLE LOCATION INDICATOR
Filed April 15, 1947                4 Sheets-Sheet 1
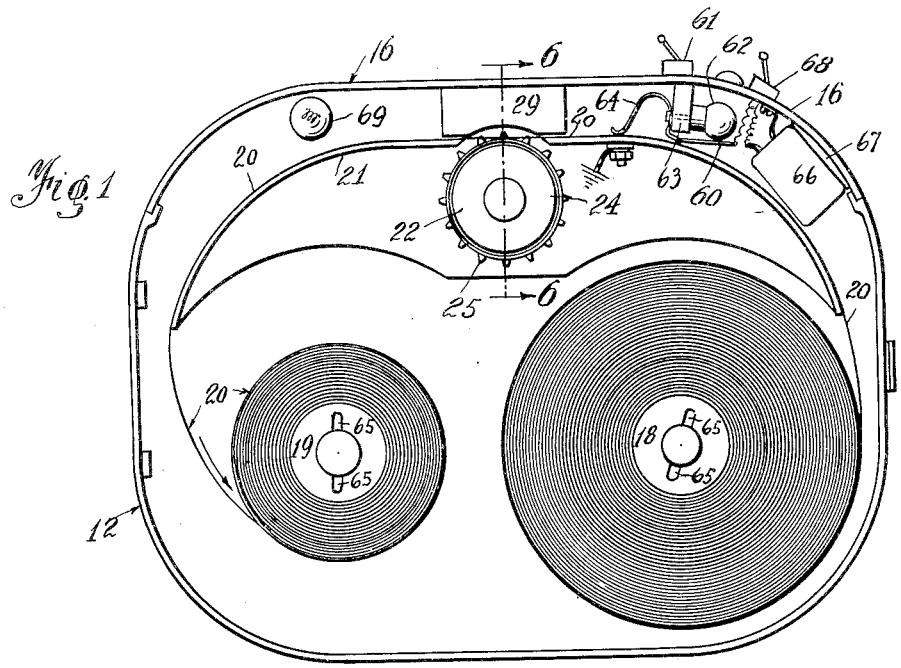
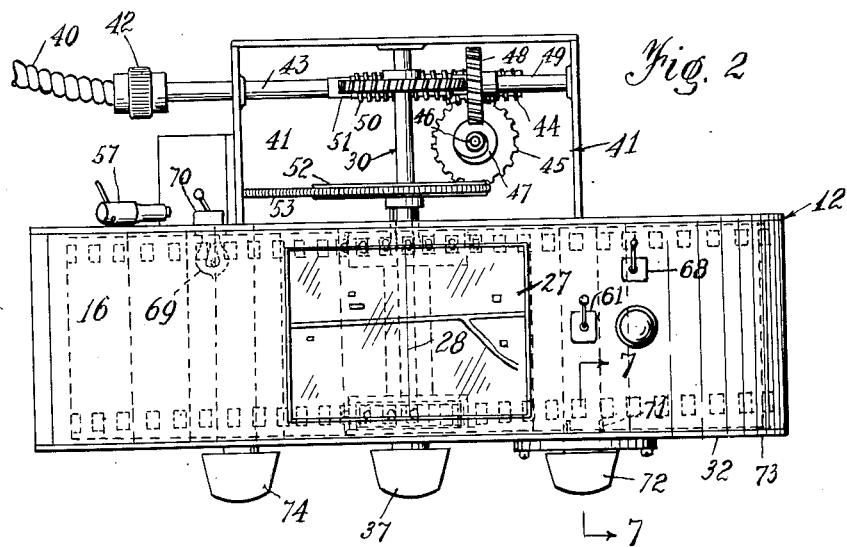
Forrest S. Field,
INVENTOR
BY Ralph Donath
ATTORNEY April 21, 1953  F. S. FIELD  2,635,372
VEHICLE LOCATION INDICATOR
Filed April 15, 1947  4 Sheets-Sheet 2
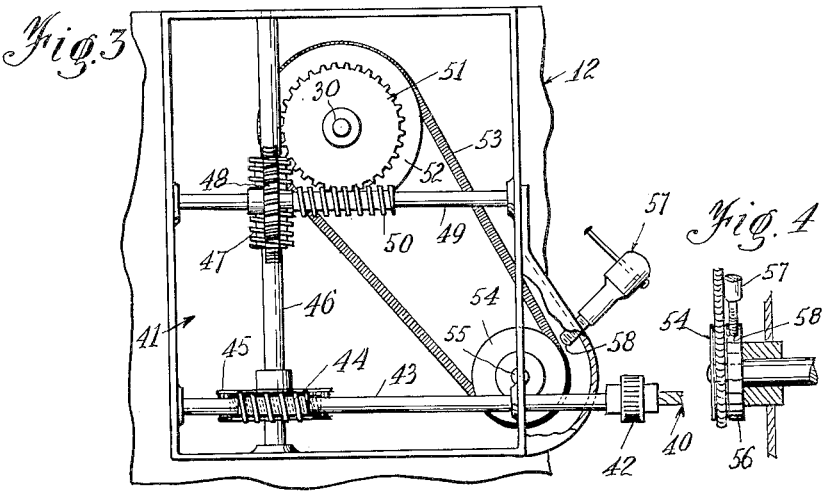
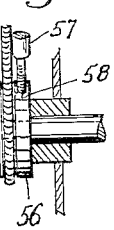
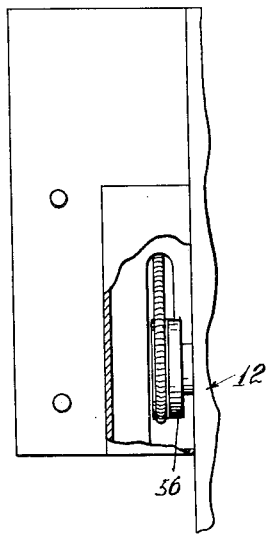
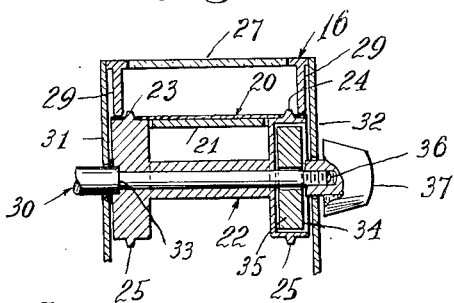
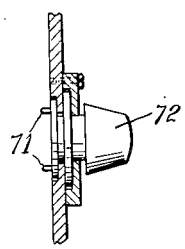
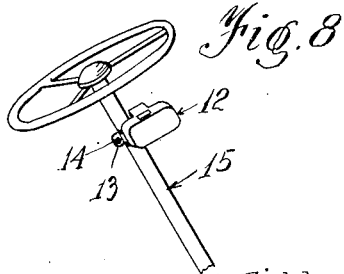
Forrest S. Field,
INVENTOR
BY Ralph Donath
ATTORNEY

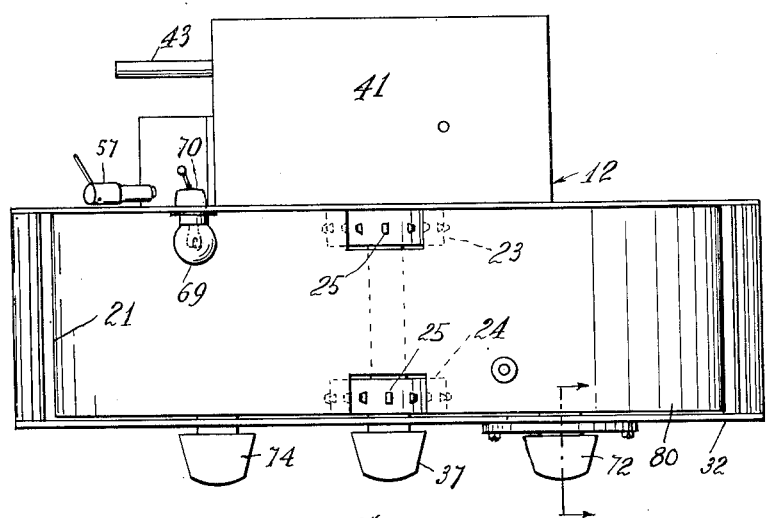
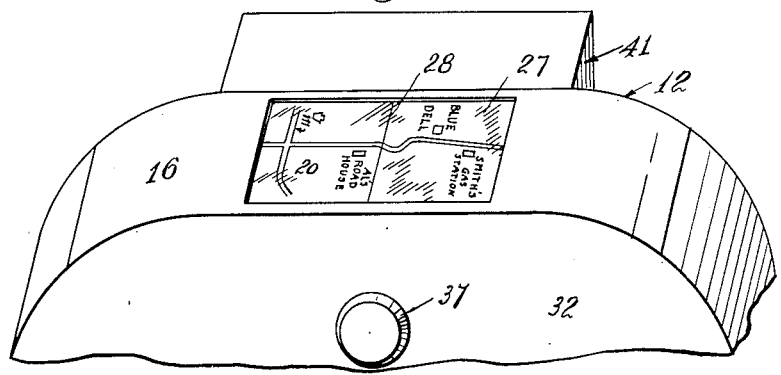
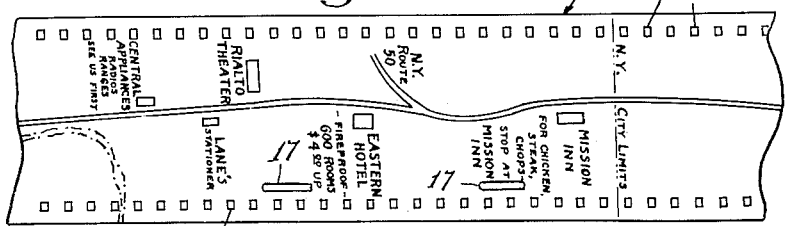

Patented Apr. 21, 1953

2,635,372

UNITED STATES PATENT OFFICE 2,635,372

VEHICLE LOCATION INDICATOR

Forrest S. Field, Pittsburgh, Pa.

Application April 15, 1947, Serial No. 741,483

1 Claim. (Cl. 40—42)

This invention relates to devices that indicate the momentary geographical location of vehicles such as automobiles, buses, street cars etc. upon which they are operatively mounted.

One of the objects of the invention is to provide a location indicator which constantly and automatically shows the reasonably accurate geographical position of the vehicle on a ribbon-shaped map.

Another object of the invention is to provide a location indicator in which the ribbon-shaped map is translated beneath a stationary hairline with a speed that is proportional to the speed of the vehicle on the road.

Still another object of the invention is to provide a location indicator in which a ribbon-shaped map, having rows of perforations, is translated by a toothed drum directly or indirectly positively driven from one road contacting wheel of the vehicle with a speed proportional to that of the vehicle on the road and the drum upon which the ribbon is wound is urged rotatively ahead with a selectively variable frictional force so that the ribbon is reeled upon the drum under a pull, keeping it taut.

Yet another object of the invention is to provide a device of the character described in which a ribbon-shaped map is translated with a speed proportional to the vehicle's speed and coacts with light and sound producing means for indicating the location of the vehicle on the map and also that of predetermined points of interest or of anticipatable danger.

Another object of the invention is to provide a location indicator which is positively driven by one wheel of the vehicle or by a device positively coupled to said wheel and has simple and efficient means for engagement, disengagement and setting of this drive relative to the map on which the location of the vehicle is indicated.

Another object is to provide a device of the character described in which positive feeding means for the ribbon are connected to positive driving means by a selectively releasable friction lock including a driving shaft having a shoulder at one end and a threaded portion, carrying a threaded knob, at the other for clamping the feeding sprocket wheel operatively to the driving shaft.

A further object is to provide an apparatus of the type set forth which is encased in a housing mounting two drums upon which a map carrying ribbon is wound, said housing being equipped with a substantially convex guide extending between the drums for supporting, guiding and frictionally retarding the ribbon, keeping it taut against the pull of the feeding means and that of the winding drum.

Another object is to provide for vehicles a location indicator encased in a housing having attachment means for fixing it to the steering column of the vehicle and an aperture at its top sealed by a cover carrying guard means having suitably shaped edges to coact with the substantially convex guide of the housing for retaining the ribbon thereon and having electrical contact-, light-, and sound-means associated therewith for cooperation with perforations on said ribbon for intermittently energizing and deenergizing them according to a predetermined plan embodied in the map carried by the ribbon.

A further object of the invention is to provide a novel ribbon-shaped road map which will give the true indication of the momentary location of the vehicle at all times and is provided with means cooperating with electrical light- and sound-devices to call attention to predetermined points of interest or of anticipated danger well in advance of reaching the particular points.

Yet another object of the invention is to provide a road indicating device which will occupy very little space and which will be readily adjustable so that any desired starting point may be brought in proximity to the window of the device.

Another object of the invention is to provide means whereby the differences of diameters of the map web or ribbon may be automatically compensated for.

Still another object of the invention is to provide vehicles with a location indicator by means of which driving through unfamiliar territory is greatly facilitated.

Further objects of the invention are to provide a device of the type set forth which is simple in its construction and arrangements, efficient and accurate in its operation, readily installed in any vehicle and inexpensive to manufacture.

To the accomplishment of these and such other objects as may hereafter appear the invention consists of the novel construction, combination and arrangement of parts herein specifically described and illustrated in the accompanying drawings showing a preferred embodiment of the invention.

In the drawings wherein like numerals of reference designate corresponding parts throughout the several views, Figure 1 is a front elevational view of the device, the front cover having been removed to show the interior thereof.

Figure 2 is a plan view of the device shown in Figure 1, the top cover of the speed reducer housing having been removed.

Figure 3 is a fragmentary rear elevational view showing the interior of the speed reducer housing and the gearing and belt drive mounted therein, the rear wall of the housing having been removed.

Figure 4 is a fragmentary elevational side view of the belt driven pulley and connected brake shown in Figure 3.

Figure 5 is a fragmentary side elevational view of the device, the side wall of the speed reducer housing being partially broken away to show the elevational side view of the belt driven pulley, illustrated also in Figure 4.

Figure 6 is a partial sectional view on line 6—6 in Figure 1.

Figure 7 is a partial sectional view on line 7—7 in Figure 2.

Figure 8 is a perspective view of the device shown attached to the steering wheel column of an automobile, drawn to a smaller scale.

Figure 9 is a plan view of the device after removing its cover.

Figure 10 is a fractional perspective view of the device showing its upper portion.

Figure 11 is a top plan view of a portion of the ribbon-shaped map detached from the device.

Figure 12 is a sectional view of a portion of the ribbon shaped map showing a modified form of contactor device.

Figure 13:
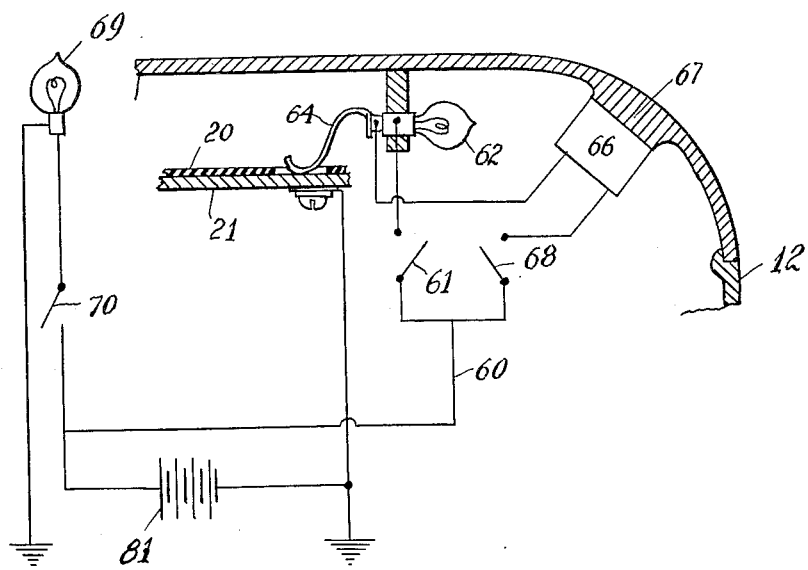
Fig. 13 is a wiring diagram showing the electrical connections of the electrical contact-, light-, and sound-means.

Referring now to the drawings, the housing 12 is provided with attachment means such as straps 13 and bolt 14 for fastening it to suitable stationary parts of a vehicle such as the steering column 15 shown in Figure 8. Cover 16 seals aperture 80 at the top of housing 12 in any suitable manner.

In housing 12 are rotatably mounted the driven drum 18 and the driving drum 19 upon which the map carrying ribbon 20 is wound. This map carrying ribbon or web 20 consists of a strip of suitable paper, film, plastics or similar electrically non-conducting material, each end of which is fastened by known means (not shown) to one of the drums 18 and 19.

As best shown in Figure 11, the ribbon 20 is provided with equally spaced perforations or slots 26 running on both sides close to the edges in longitudinal direction and also with elongated apertures 17, the purpose of which will be hereinafter described. On map carrying ribbon 20 is shown a suitable portion of the road to be traveled by the vehicle projected substantially in a line running longitudinally on the map. Besides the road important crossings, hills, bridges and other points of interest or of anticipated danger are indicated.

Ribbon 20 is passing from the driven drum 18 to the driving drum 19 supported in between by a substantially convex guide 21 (that may have at its central relatively small portion a flat region) which is fastened to, or integral with, the housing 12. The twin sprocket wheel 22 is rotatably mounted between drums 18 and 19.

As best shown in Figures 2, 3 and 6 the wheel 22 has two sprocket portions 23 and 24 the teeth 25 of which engage the map 20 by its perforations 26. The peripheries of the toothed portions 23 and 24 of wheel 22 at the roots of teeth 25 are substantially tangential to the top surface of guide 21 on which ribbon 20 is moving so that teeth 25 register with the perforations 26 of map 20, and engage them properly.

The cover 16 is provided with a transparent window 27 made of glass or plastic through which the map 20 can be observed. Preferably at its middle portion window 27 is equipped with a hairline 28 extending across the ribbon 20. Cover 16 is also provided with guards or ribs 29 which, with suitable clearance to the substantially convex guide 21, are correspondingly shaped at their ends and slidingly engage the ribbon 20 adjacent to its longitudinal edges keeping the map in contact with the sprocket wheel portions 23 and 24 and teeth 25 engaged with the perforations or slots 26.

The drive shaft 30 is supported rotatably but in axial direction fixedly by the rear wall 31 of housing 12 and by its front cover 32. The twin sprocket wheel 22 is freely rotatable on drive shaft 30 which has a shoulder 33 coacting with a suitable face of the sprocket portion 23. The sprocket portion 24 has an aperture 34 in which is rotatably and slidingly accommodated spacer 35 which is rotatably mounted on drive shaft 30 the end portion 36 of which is threaded, carrying a knob-shaped nut 37. By tightening nut 37 on threaded drive shaft end 36 the knob engages spacer 35 and creates a pressure between itself, twin sprocket wheel 22, shoulder 33 and spacer 35 causing a tight frictional connection between the drive shaft 30 and the twin sprocket wheel 22. I call this structure a friction lock.

As best shown in Figures 2 and 3, means are provided to operatively and positively connect drive shaft 30 with a road contacting wheel of the vehicle (not shown). A preferable flexible shaft 40 is operatively connected by gearing or other known means (not shown) directly, or indirectly through the speedometer or other device (not shown) to one wheel of the vehicle on which it travels.

A suitable speed reducer, generally denoted 41, is interposed between the shaft 40 and the driving shaft 30. This speed reducer may be of any approved type and is shown in the exemplary embodiment to consist of a coupling 42 connecting shaft 40 to intermediate shaft 43 carrying rigidly the first worm 44 coacting with first worm gear 45 which is keyed to shaft 46 that fixedly carries the second worm 47 in mesh with second worm gear 48 that in turn is keyed to shaft 49 to which is rigidly attached the third worm 50 in mesh with third worm gear 51 fixed to the drive shaft 30. This drive shaft 30 carries also fixedly V-pulley 52 which is operatively connected by an endless belt, such as a helical spring belt 53, shown, with a V-pulley 54 that has a smaller diameter than that of pulley 52 and is rigidly attached to shaft 55 mounted in housing 12. Rigidly fixed to said shaft 55 is the driving drum 19.

As shown in Figures 4 and 5, the brake drum 56 is integral with, or rigidly secured to, pulley 54. The brake 57 is a threaded bar having a head suitably shaped for hand operation for holding it in place when screwed into casing 12, radially to brake drum 56 so that the tip 58 of brake 57 engages the brake drum 56 with selectively variable pressure.

The metallic housing 12 and with it the guide 21 is electrically connected to the metallic mass of the vehicle, by the attachment means clamping it to the steering post, such connection being better known as grounding. As illustrated in the wiring diagram represented by Fig. 13, coming from a source of electric current (such as battery 81), lead 60 is connected through switch 61 to electric light bulb 62 carried by an insulator 63 mounted on top cover 16; the second lead from this light bulb 62 is grounded through spring 64 and guide 21. Said contact spring 64 impinges upon map carrying ribbon 20 (made of an electric insulating material) having longitudinal slots 17, aligned with said spring 64 so that their longitudinal center planes coincide. These slots 17 may be located suitably ahead of predetermined points of interest or danger.

Parallelly connected to light bulb 62 is an electric buzzer 66, which is preferably also mounted on cover 16 by insulator 67 and connected through switch 68 to lead 60, while its second lead is electrically connected to the mass of the vehicle or ground. Light bulb 62 is preferably colored.

It will be understood that the slots 17 shown on map 20 (Figure 11) could be eliminated and replaced by short metallic wire staples 59, such as commonly used for attaching two or more papers together and shown in Figure 12 of the drawings, or other similar metallic contacts. The action of the staples 59 are identical with that of slots 17.

A second light bulb 69 is connected through switch 70 to lead 60. When switch 70 is closed the light bulb 69 is energized and throws sufficient light on ribbon-shaped map 20 to be clearly legible to the observer through the window 27.

Drums 18 and 19 have suitable apertures 65 (Figure 1) which cooperate with pins 71 of knob 72 (Figure 7) rotatably mounted in operatively coacting position in front cover 73 of housing 12 (Figures 2 and 9), fastened by any suitable means.

The device operates as follows:

The ribbon 20 has illustrated or printed thereon a map of the road, shown to be substantially in a line lengthwise to ribbon 20, on which the car is traveling. At the start, the top cover 16 is removed and the ribbon-shaped map 20 inserted upon drums 18 and 19, over guide 21 and twin sprocket wheel 22, so that teeth 25 engage the slots 26 of the ribbon 20. Then cover 16 is replaced, switch 70 is closed so that the light bulb 69 illuminates the ribbon 20 which will be now set to correspond to actual location of the vehicle. For this purpose knob 37 is somewhat unscrewed so that it releases spacer 35 and drum 22 from being connected by friction to drive shaft 30.

Ribbon 20 can now be wound freely on drums 18 and 19 by turning the corresponding knobs 72 clockwise or 74 counterclockwise, the pins 71 of the knob 72 engaging the drum 18. Spring belt 53 will slide with permissible friction on V-pulley 54, the brake drum 56 of which will slide in contact with end portion 58 of brake 57. Strip 20 will be adjusted so that the hairline 28 points to the actual location of the standing car on the road mapped on ribbon 20. The ratio between the vehicle wheel from which the shaft 40 transmits the motion to drive shaft 30 is such that it corresponds to the scale of the map shown on ribbon 20 so that for each mile traveled by the car on the road the respective distance with which the ribbon 20 is moved under the hair line 28 scales one mile. It will be understood that the map of the road is shown in one direction running lengthwise of the ribbon so that with the proper ratio of speed reduction between the car wheel and the drive shaft 30 of the device, the sprocket portions 23 and 24, and with them the ribbon 20 will be moved by such speed that corresponds to the actual speed of the car so that the hair line 28 will point always to the car's actual location on map 20.

To effect the frictional locking of shaft 30 to the flexible shaft 40, the knob 37 is tightened thereon with sufficient force which locks the twin sprocket wheel 22 between the shoulder 33 and the knob 37 on shaft 30. When the vehicle travels drive shaft 30 with toothed twin sprocket wheel 22 is rotated with proper speed to move the ribbon under the hair line 28 so that the latter points always out the actual position on the road no matter whether the car moved forward or backward. The crossway travel of the car is negligble compared to that in forward direction hence will cause only negligible error.

It will be noted that the wheel pulley 52 has greater diameter than that of the driven pulley 54 which is rigidly connected to shaft 55 to which driving drum 19 is fixed. The effect of this will be that the drum 19 will tend to rotate with greater speed than that of the twin sprocket wheel 22, consequently ribbon 20 will be always pulled toward the driving drum 19 and will be kept taut. This pull and resulting tensile stress can be regulated by brake 57. Screwing brake 57 tighter toward brake drum 56 the pulley 54 and with it drum 19 is retarded by a frictional force on brake drum 56 acting against the frictional force operating between belt 53 and pulley 54. As a result belt 53 will slip on pulley 54 and ribbon 20 will be pulled by lesser force. By releasing the brake 57 somewhat the friction and its braking effect on drum 56 will diminish and belt 53 will be more effective in driving the drum 19 and pulling ribbon 20 which will be stressed with greater force. The unwinding drum 18 is retarded by friction of its shaft in its bearings which will furnish a sufficient retarding force to keep the unwinding side of ribbon 20 sufficiently taut on substantially convex guide 21 which tautness is further promoted by contact with guards 29 and by friction with the guide 21 on which the ribbon-shaped map 20 is sliding.

The magnitude of the frictional retarding force of arcuate guide 21 upon ribbon 20 can be best appreciated by treating it as the frictional resistance of a belt on a drum or pulley here represented by the stationary arcuate guide 21.

As well known in mechanical engineering the frictional resistance W of a belt, rope or band on a drum is mathematically expressed (see (Marks: "Mechanical Engineers Handbook," second edition, page 250) $W = (e^{fb} - 1)t$ where $e = 2718$, the base of the Naperian system of logarithms; $f =$ the frictional coefficient between the band and the pulley;

$$b = \frac{2\pi b^0}{360} = \text{the angle subtending the arc of contact, in radians}$$

$t =$ the tension of the ribbon on slack side;
$b^0$ is sum of central angles of curved contact portions.

Above proven formula shows that arcuate guide 21 (where the value of $b$ is positive) will exert a positive frictional force $W$ that will keep the ribbon 20 taut, while straight plane guides (where $b^0=0$, $b=0$, $e^{fb}=1$ and $W=0$) will cause no such tautness in ribbon 20.

Having fully disclosed my invention and described and illustrated a preferred embodiment thereof, it will be understood that various changes and modifications may be made in the combined structures by those versed in the art without departing from the spirit and scope of my invention, hence I do not intend to be limited by this exemplary embodiment, but what I claim as new and desire to secure by Letters Patent is:

In a vehicle location indicator having a ribbon map positively driven by a toothed feed roll between two drums, the improvement in winding mechanisms comprising an apron supporting the ribbon map, said apron having openings through which the teeth of the feed roll project to engage the ribbon map, holding means extending over the ribbon map and apron at the point where the feed rolls engage the map and at a level below the top of the feed roll teeth whereby the map is retained on the feed roll teeth, a pulley on said toothed feed roll, a second pulley of smaller diameter on the drum upon which the ribbon map is wound, frictional belt means connecting said pulleys tending to rotate the wind-up drum at a peripheral speed in excess of the toothed feed roll whereby tension is produced in the ribbon map, a brake drum mounted on said wind-up drum and adjustable drum retarding means mounted adjacent to and acting on the brake drum whereby the effect of the frictional drive on the wind-up drum may be varied to control the tension on the ribbon map.

FORREST S. FIELD.

References Cited in the file of this patent

UNITED STATES PATENTS

| Number | Name | Date |
|---|---|---|
| 915,976 | Lindenthaler et al. | Mar. 23, 1909 |
| 1,039,848 | Triplett | Oct. 1, 1912 |
| 1,113,747 | Boyden | Oct. 13, 1914 |
| 1,159,478 | Ebert | Nov. 9, 1915 |
| 1,236,565 | Hubschmitt | Aug. 14, 1917 |
| 1,749,243 | Eglinton | Mar. 4, 1930 |
| 1,818,509 | Self | Aug. 11, 1931 |
| 2,130,224 | Boykow | Sept. 13, 1938 |

FOREIGN PATENTS

| Number | Country | Date |
|---|---|---|
| 358,199 | Italy | Apr. 8, 1938 |